United States Patent Office 3,514,445
Patented May 26, 1970

---

3,514,445
1-ACYLATED BENZODIAZEPINE COMPOUNDS
Stanley C. Bell, Philadelphia, Pa., assignor to American Home Products Corporation, New York, N.Y., a corporation of Delaware
No Drawing. Continuation of application Ser. No. 228,725, Oct. 5, 1962. This application Aug. 13, 1965, Ser. No. 479,667
Int. Cl. C07d 53/06
U.S. Cl. 260—239.3    11 Claims

ABSTRACT OF THE DISCLOSURE

This invention relates to novel acylated 3-oxygenated-2H-1,4-benzodiazepin-2-ones having significant psychotherapeutic activity. The compounds of this invention have valuable anti-convulsant, and muscle-relaxing effects. Some of them exhibit sedative effects and some are tranquilizers without being sedatives. These compounds are also intermediates in the production of other pharmacologically active compounds.

---

This application is a continuation of co-pending application Ser. No. 228,725, filed Oct. 5, 1962, now abandoned.

The products of this invention may be administered parenterally or orally, and may be combined with diluents, solvents, suspending agents, fillers, excipients, adhesives, coloring and flavoring materials, etc., as desired for the preparation of convenient dosage forms.

The pharmacologically active compounds of this invention may be represented by the formula

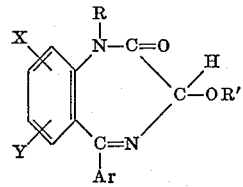

(I)

where Ar is a radical such as phenyl, thienyl, or phenyl substituted by chlorine, fluorine, methoxy, methyl, or trifluoromethyl, X and Y each represent hydrogen or a substituent of the group consisting of chlorine, bromine, nitro, trifluoromethyl, and methylsulfonyl; R and R' are the same or different and are acyl radicals of monocarboxylic acids. Among suitable acyl radicals of monocarboxylic acids may be mentioned acetyl, propionyl, caproyl, benzoyl, toluyl, phenylacetyl, beta-phenylpropionyl and cinnamoyl and haloacyl radicals such as chloroacetyl, chlorobenzoyl, and bromobenzoyl.

Preferably, Ar is phenyl or chlorophenyl, and X and Y represent hydrogen and a 7-chloro substituent, respectively.

In South African Pat. 60/4,931, and in co-pending application Ser. No. 87,102, filed Feb. 6, 1961, there are described 1,3-dihydro-1,4-benzodiazepin-2-one 4-oxides which can be represented by the formula

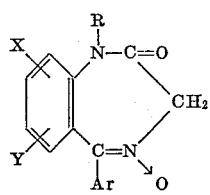

(II)

wherein R represents hydrogen or a hydrocarbon radical and X, Y, and Ar have the meanings above recited, together with methods for their preparation.

It has been found, surprisingly, that by heating a 1,3-dihydro-2H-1,4-benzodiazepin-2-one-4-oxide of Formula II where R is H with a monocarboxylic acid anhydride, there is formed, in very high yield, a product having the Formula I, above, where R and R' are the same.

Products of Formula I, above, where R and R' are different are obtained similarly by heating a compound having the formula:

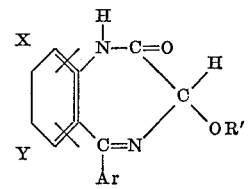

(III)

where X, Y, $A_r$ and R' are as above stated with a monocarboxylic acid anhydride. Compounds of Formula III together with methods for their preparation are disclosed and claimed in application, U.S. Ser. No. 177,174, filed Mar. 5, 1962, now abandoned.

The reaction of this invention may be carried out in the presence of, or but preferably in the absence of a solvent and at a temperature range of 90° to 140° C. Where an inert solvent is used, the temperature range for this reaction is from 50° C. up to the boiling point of the solvent. Inert solvents suitable for this reaction include toluene, tetralin, tetrachlorethylene, xylene, acetic acid, diethylene glycol dimethyl ether, as well as various inert hydrocarbons, and which will be obvious to those skilled in art to which this invention appertains.

Compounds of Formula I may be hydrolyzed to the corresponding compounds where the 1-substituent is hydrogen, in accordance with the procedure described and claimed in my co-pending application Ser. No. 228,726, filed Oct. 5, 1962, now U.S. Pat. No. 3,176,009. The latter compounds may in turn by hydrolyzed with alkali metal hydroxide to form 3-hydroxy-1,3-dihydro-2H-1,4-benzodiazepin-2-one compounds which are disclosed and claimed in my application Ser. No. 177,174, filed Mar. 5, 1962, now abandoned.

The following examples illustrate the process of the invention.

EXAMPLE 1

A mixture of 5.0 g. of 7-chloro-1,3-dihydro-5-phenyl-2H-1,4-benzodiazepin-2-one 4-oxide and 50 ml. of acetic anhydride is refluxed for one hour. The solvent is removed in vacuo and the product recrystallized twice from cyclohexane giving analytically pure 3-acetoxy-1-acetyl-7-chloro-1,3-dihydro-5-phenyl-2H-1,4-benzodiazepin-2-one, M.P. 170–172°.

*Analysis.*—Calcd. for $C_{19}H_{15}ClN_2O_4$ (percent): C, 61.54; H, 4.08; N, 7.56. Found (percent): C, 61.69; H, 4.34; N, 7.15.

EXAMPLE 2

3-acetoxy-1-acetyl-7-chloro-5-(o-chlorophenyl)-1,3-dihydro-2H-1,4-benzodiazepin-2-one, M.P. 171–173°, is prepared from 5 g. of 7-chloro-5-(o-chlorophenyl)-1,3-dihydro-2H-1,4-benzodiazepin-2-one 4-oxide and 50 ml. of acetic anhydride according to the procedure of Example 1.

*Analysis.*—Calcd. for $C_{19}H_{14}Cl_2N_2O_4$ (percent): C, 56.31; H, 3.48; N, 6.92; Cl, 17.50. Found (percent): C, 56.37; H, 3.88; N, 7.02; Cl, 17.60.

EXAMPLE 3

3-acetoxy-1-acetyl-1,3-dihydro-5-phenyl-7-trifluoromethyl-2H-1,4-benzodiazepin-2-one is prepared from 5 g. of 1,3-dihydro-5-phenyl-7-trifluoromethyl-2H-1,4-benzodiazepin-2-one 4-oxide, and 50 ml. of acetic anhydride according to the procedure of Example 1.

EXAMPLE 4

3-acetoxy-1-acetyl-7-bromo-1,3-dihydro-5-p-tolyl-2H-1,4-benzodiazepine-2-one is prepared from 5 g. 7-bromo-1,3-dihydro-5-p-tolyl-2H-1,4-benzodiazepine-2-one 4-oxide, and 50 ml. of acetic anhydride according to the procedure of Example 1.

EXAMPLE 5

3-acetoxy-1-acetyl - 7 - nitro-1,3-dihydro-5-(2-thienyl)-2H-1,4-benzodiazepine-2-one is prepared from 5 g. 7-nitro-1,3-dihydro - 5 - (2-thienyl)-2H-1,4-benzodiazepin-2-one 4-oxide and 50 ml. of acetic anhydride according to the procedure of Example 1.

EXAMPLE 6

3 - acetoxy-1-acetyl - 7 - methylsulfonyl-1,3-dihydro-5-(p - trifluoromethylphenyl)-2H-1,4-benzodiazepine-2-one is prepared from 5 g. of 7-methylsulfonyl-1,3-dihydro-5-(p-trifluoromethylphenyl)-2H-1,4-benzodiazepin - 2 - one 4-oxide, and 50 ml. of acetic anhydride according to the procedure of Example 1.

EXAMPLE 7

3 - acetoxy - 1 - acetyl-1,3-dihydro-5-(p-fluorophenyl)-2H-1,4-benzodiazepine-2-one is prepared from 5 g. of 1,3-dihydro - 5-(p-fluorophenyl)-2H-1,4-benzodiazepin-2-one 4-oxide and 50 ml. of acetic anhydride according to the procedure of Example 1.

EXAMPLE 8

3 - acetoxy-1-acetyl-7-chloro-1,3-dihydro-5-(p-methoxyphenyl)-2H-1,4-benzodiazepine-2-one is prepared from 5 g. of 7-chloro-1,3-dihydro-5-(p-methoxyphenyl)-2H-1,4-benzodiazepin-2-one 4-oxide and 50 ml. of acetic anhydride to the procedure of Example 1.

EXAMPLE 9

A mixture 5.0 g. of 3-acetoxy-7-chloro-1,3-dihydro-5-phenyl-2H-1,4-benzodiazepin-2-one and 50 ml. of acetic anhydride is refluxed for one hour. The solvent is removed in vacuo and the product recrystallized from cyclohexane giving 3-acetoxy-1-acetyl-7-chloro-1,3-dihydro-5-phenyl-2H-1,4-benzodiazepin-2-one, M.P. 170–172°.

EXAMPLE 10

A mixture of 3.0 g. of 3-acetoxy-7-chloro-1,3-dihydro-5-phenyl-2H-1,4-benzodiazepin-2-one and 15 g. of chloroacetic anhydride is heated on the steam bath for 2 hours. Upon cooling to room temperature there is obtained 3 - acetoxy-1-chloroacetyl-7-chloro-1,3-dihydro-5-phenyl-2H-1,4-bezodiazepin-2-one, M.P. 195–197° C.

*Analysis.*—Calcd. for $C_{19}H_{14}N_2Cl_2O_4$ (percent): C, 56.31; H, 3.48; N, 6.92; Cl, 17.50. Found (percent): C, 56.02; 3.47; N, 7.00; Cl, 17.92.

EXAMPLE 11

7-chloro - 1,3 - dihydro - 1 - propionyl-3-propionoxy-5-phenyl-2H-1,4-benzodiazepin-2-one is prepared from 5.0 g. of 7-chloro-1,3-dihydro-5-phenyl-2H-1,4-benzodiazepin-2-one 4-oxide and 50 ml. of propionic anhydride according to the procedure of Example 1.

EXAMPLE 12

1-benzoyl-3-benzoxy - 7 - chloro-1,3-dihydro-5-phenyl-2H-1,4-benzodiazepin-2-one is prepared from 3 g. of 7-chloro-1,3-dihydro - 5 - phenyl-2H-1,4-benzodiazepin-2-one 4-oxide and 15 g. of benzoic anhydride, according to the procedure of Example 1.

EXAMPLE 13

7 - chloro-1,3-dihydro-1-phenylacetyl-3-phenylacetoxy-5-phenyl-2H-1,4-benzodiazepin-2-one is prepared from 3 g. of 7-chloro-1,3-dihydro-5-phenyl-2H-1,4-benzodiazepin-2-one 4-oxide and 15 g. of phenylacetic anhydride, as in Example 1.

EXAMPLE 14

1-chloroacetyl - 3 - chloroacetoxy-7-chloro-1,3-dihydro-5-phenyl-2H-1,4-benzodiazepin-2-one is prepared from 3.0 g. of 7-chloro-1,3-dihydro-5-phenyl-2H-1,4-benzodiazepin-2-one 4-oxide and 15 g. of chloroacetic anhydride acording to the procedure of Example 1.

The subject matter which the applicant regards as his invention is particularly pointed out and distinctly claimed as follows:

1. A compound having the formula

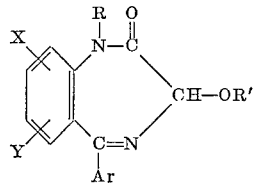

wherein X and Y are each members of the group consisting of hydrogen, chlorine, bromine, nitro, trifluoromethyl, and methylsulfonyl, R and R' are selected from the group consisting of acetyl, propionyl, caproyl, benzoyl, toluyl, phenylacetyl, beta phenylpropionyl, cinnamoyl, chloroacetyl, chlorobenzoyl, and bromobenzoyl; Ar is a radical selected from the group consisting of phenyl, thienyl, and phenyl bearing as a substituent a member of the group consisting of chlorine, fluorine, methoxy, methyl, and trifluoromethyl.

2. 3-acetoxy-1-acetyl - 7 - chloro-1,3-dihydro-5-phenyl-2H-1,4-benzodiazepine-2-one.

3. 3-lower alkanoyloxy-1-lower alkanoyl-1,3-dihydro-5-phenyl-7-halo-2H-1,4-benzodiazepin-2-one.

4. 3-lower alkanoyloxy-1-lower alkanoyl-1,3-dihydro-5-chlorophenyl-7-halo-2H-1,4-benzodiazepine-2-one.

5. 3-acetoxy-1-acetyl - 7 - chloro-5-(o-chlorophenyl)-1,3-dihydro-2H-1,4-benzodiazepine-2-one.

6. Process which comprises heating to a temperature of at least 50° C. a compound having the formula

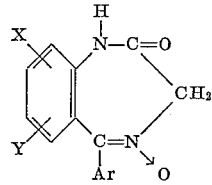

wherein X and Y are each members of the group consisting of hydrogen, chlorine, bromine, nitro, trifluoromethyl, and methylsulfonyl, and Ar is an aryl radical selected from the group consisting of phenyl, thienyl, and phenyl bearing as a substituent a member of the group consisting of chlorine, fluorine, methoxy, methyl and trifluoromethyl, with an anhydride selected from the group consisting of acetic anhydride, propionic anhydride, caproic anhydride, benzoic anhydride, toluic anhydride, phenylacetic anhydride, beta-phenylpropionic anhydride, cinnamic anhydride, chloroacetic anhydride, chlorobenzoic anhydride, and bromobenzoic anhydride, and recovering a product having the formula

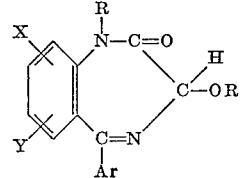

where R is selected from the group consisting of acetyl, propionyl, caproyl, benzoyl, toluyl, phenylacetyl, beta-phenylpropionyl, cinnamoyl, chloroacetyl, chlorobenzoyl, and bromobenzoyl, and X, Y, and Ar have the meanings previously given.

7. Process according to claim 6, wherein heating is effected in the presence of an inert solvent and at a temperature ranging from about 50° C. to the boiling point of said solvent.

8. Process according to claim 6, wherein the reaction temperature ranges from about 50° C. to about 140° C.

9. Process according to claim 6, wherein the reaction temperature ranges from about 90° C. to about 140° C.

10. A process which comprises heating to a temperature of at least 50° C. a compound having the formula

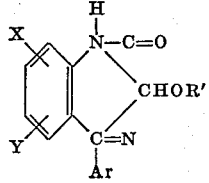

where X and Y are each members of the group consisting of hydrogen, chlorine, bromine, nitro, trifluoromethyl and methylsulfonyl; Ar is a radical selected from the group consisting of phenyl, thienyl and phenyl bearing as a substituent a member of the group consisting of chlorine, fluorine, methoxy, methyl and trifluoromethyl; and R' is selected from the group consisting of acetyl, propionyl, caproyl, benzoyl, toluyl, phenylacetyl, beta-phenylpropionyl, cinnamoyl, chloroacetyl, chlorobenzoyl, and bromobenzoyl with an anhydride selected from the group consisting of acetic anhydride, propionic anhydride, caproic anhydride, benzoic anhydride, toluic anhydride, phenylacetic anhydride, beta-phenylpropionic anhydride, cinnamic anhydride, chloroacetic anhydride, chlorobenzoic anhydride, and bromobenzoic anhydride and recovering a product having the formula

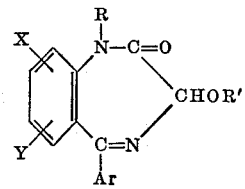

where X, Y, Ar and R' are as above stated and R is selected from the group consisting of acetyl, propionyl, caproyl, benzoyl, toluyl, phenylacetyl, beta-phenylpropionyl, cinnamoyl, chloroacetyl, chlorobenzoyl, and bromobenzoyl, R and R' being different.

11. The process which comprises reacting 7-chloro-1,3-dihydro-5-phenyl-2H-1,4-benzodiazepin-2-one 4-oxide with acetic anhydride to produce 3-acetoxy-1-acetyl-7-chloro-5-phenyl-1,3-dihydro-2H-1,4-benzodiazepin-2-one.

References Cited

UNITED STATES PATENTS 3,176,009  3/1965  Bell _____ 260—239.3

HENRY R. JILES, Primary Examiner

R. T. BOND, Assistant Examiner

U.S. Cl. X.R.

424—244, 275